Figure 1:
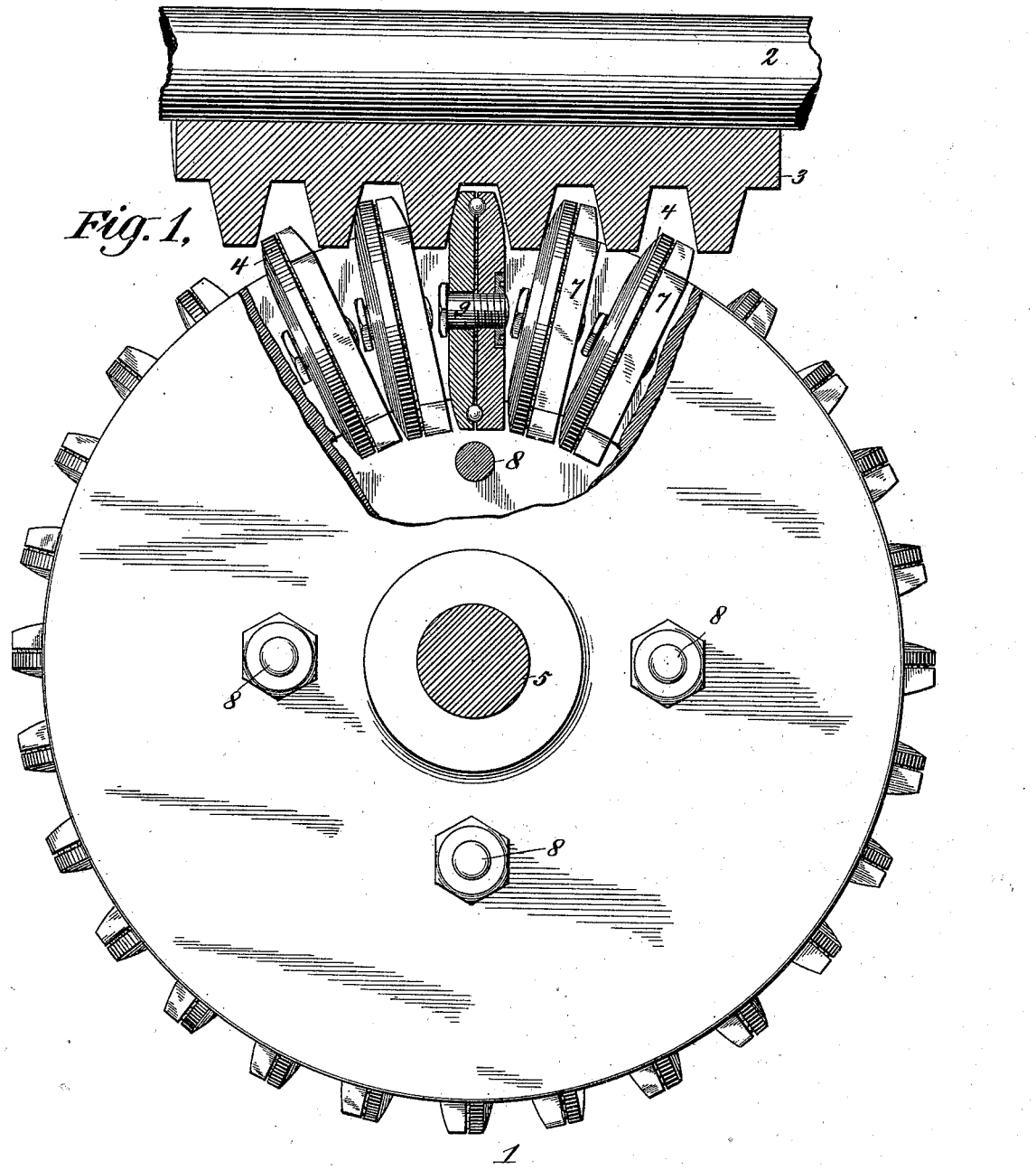

No. 624,734. Patented May 9, 1899.
J. H. BARR.
WORM GEARING.
(Application filed Aug. 31, 1898.)
(No Model.) 2 Sheets—Sheet 1.

WITNESSES:

INVENTOR
John H. Barr
BY
ATTORNEYS

No. 624,734. Patented May 9, 1899.
J. H. BARR.
WORM GEARING.
(Application filed Aug. 31, 1898.)
(No Model.) 2 Sheets—Sheet 2.
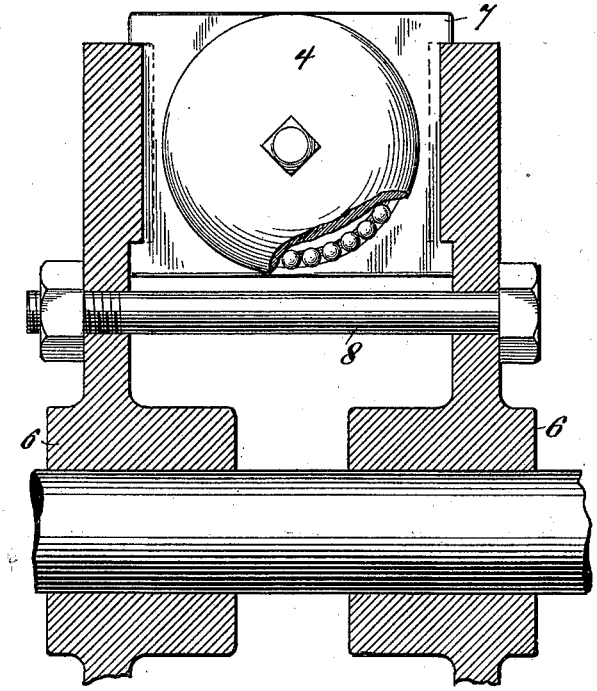
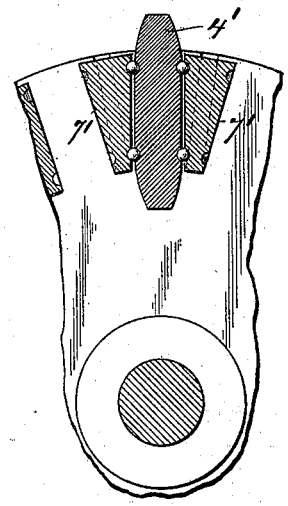
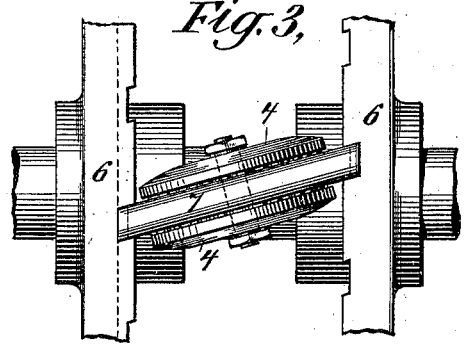
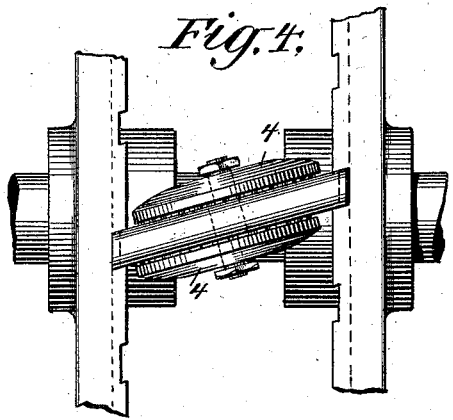
WITNESSES:
INVENTOR
John H. Barr
BY
ATTORNEYS

UNITED STATES PATENT OFFICE.

JOHN H. BARR, OF ITHACA, NEW YORK.

WORM-GEARING.

SPECIFICATION forming part of Letters Patent No. 624,734, dated May 9, 1899.

Application filed August 31, 1898. Serial No. 689,898. (No model.)

*To all whom it may concern:*

Be it known that I, JOHN H. BARR, a citizen of the United States, residing at Ithaca, in the county of Tompkins and State of New York, have invented certain new and useful Improvements in Worm-Gearing; and I do hereby declare the following to be a full, clear, and exact description of the invention, such as will enable others skilled in the art to which it appertains to make and use the same.

My invention relates to improvements in worm-gearing, and has for its principal object the reduction of friction in such gearing through the elimination of the lateral sliding movement of the surfaces of the teeth of the worm and worm-wheel which are in contact, to which movement by far the greater amount of the friction of worm-gearing is due.

Further objects of my invention are to provide a compact and simple construction for the worm-wheel, to provide means for employing ball-bearings between the friction-disks and their supports, and to provide a construction for the worm-wheel such that said wheel may be made comparatively cheaply and its parts may be assembled and taken apart readily.

These objects are attained in the invention herein described and illustrated in the drawings which accompany and form a part of this specification, in which the same reference-numerals indicate the same or corresponding parts, and in which—

Figure 1 is a detail side elevation and partial section of a worm-wheel constructed in accordance with my invention, a portion of a worm being shown in engagement therewith. Fig. 2 is an axial section of the worm-wheel. Figs. 3 and 4 are detail elevations showing constructions in which the friction-disks are set at an angle to the axis of the shaft; and Fig. 5 is a detail section of the worm-wheel, taken transversely to the shaft, showing another arrangement of the friction-disks, each disk forming a complete tooth.

My invention consists in the use upon the teeth of the worm-wheel of revolubly-mounted friction-disks, with which the threads or teeth of the worm engage, arranged to rotate with the worm when the latter is in contact therewith, thus eliminating the lateral sliding movement to which the greater portion of friction of worm-gearing is due and leaving only a slight twisting movement between the teeth of the worm and the friction-disks, which twisting movement produces comparatively little friction; and my invention also consists in the novel construction, combination, and arrangement of the parts.

In the drawings, 1 is the worm-wheel, and 2 a worm-shaft having upon it a worm 3, only a portion of which is shown. Upon the driving-faces of the teeth of the worm-wheel are revolubly mounted friction-disks 4, the edges of which have the contour of the teeth of a worm-wheel. For convenience in construction the worm-wheel preferably has inserted teeth and may be constructed as follows: Upon the shaft 5 of the worm-wheel are mounted two side pieces 6, which are grooved at proper intervals to receive supporting-pieces 7, to which the friction-disks 4 are pivoted. The side pieces 6 and the supporting-pieces 7 are provided with interlocking shoulders, so that when once the side pieces are drawn together by bolts 8 the supporting-pieces are held firmly in place. If the worm-wheel be intended to drive or to be driven under load in but one direction, so that in practice the teeth of the worm will bear heavily against one side only of each tooth of the worm-wheel, the teeth may be provided with friction-disks 4 upon one side only, and this is the construction illustrated in Fig. 1; but if the worm is to be driven or to drive under load in both directions it should have friction-disks 4 upon both sides of the teeth, and this construction is illustrated in Figs. 3 and 4.

The friction-disks 4 are held to their respective supporting-pieces by pivot-screws 9; but the pressure of the worm against the friction-disks is taken up principally by ball-bearings located near the edges of said disks. Each friction-disk is provided near its edge with a groove registering with a corresponding groove in its supporting-piece, and into these grooves balls are inserted. Because the pressure of the worm is taken by these ball-bearings, which permit the friction-disks to revolve with very little friction even when the pressure is great, the friction-disks revolve very easily.

For many purposes it is permissible to have the teeth of the worm-wheel parallel with its shaft, the worm itself being set obliquely to said shaft. This is an arrangement common in worm-gearing and is an arrangement which is particularly advantageous for my worm-wheel, since it permits the supporting-pieces 7 to be placed parallel to the axis of the worm-wheel; but where it is not practicable to place the worm at an angle the supporting-pieces 7 may be placed at an angle, as shown in Figs. 3 and 4. In the construction shown in Fig. 3 the two disks of the tooth there shown rotate about the same axis. This construction is not theoretically correct, since neither disk can then be located centrally between the side pieces 6, but it is sufficiently correct for many purposes. A more correct construction theoretically is shown in Fig. 4, in which the disks 4 rotate about different axes, the journals on the pivot-pin being offset.

Instead of employing two friction-disks for each tooth, as shown in Figs. 3 and 4, each disk being shaped to correspond to one side only of the tooth, a single disk having two working faces and mounted between two supporting-pieces may be used. This construction is shown in Fig. 5. 4' is a friction-disk constituting a tooth of a worm-wheel, and 7' 7' are the two supporting-pieces between which it revolves.

Having thus completely described my invention, what I claim, and desire to secure by Letters Patent, is—

1. A worm-wheel provided with revoluble friction-disks with which the teeth of a worm engaging with said worm-wheel may contact, substantially as described.

2. A worm-wheel provided with friction-disks mounted to rotate in a direction corresponding to the direction of rotation of a worm engaging with said worm-wheel, and with which the teeth of the worm may contact, substantially as described.

3. A worm-wheel provided with friction-disks curved at the edges to correspond with the curve of the teeth of worm-wheels, said disks being arranged to contact with and receive the pressure of the teeth of a worm engaging said worm-wheel, and being arranged to rotate in a direction corresponding to the direction of rotation of such worm, substantially as described.

4. A worm-wheel having for each tooth two friction-disks, forming the front and back faces of the tooth, and mounted to rotate in a direction corresponding to the direction of rotation of a worm engaging said worm-wheel, and with which the teeth of the worm may contact, substantially as described.

5. A worm-wheel provided with friction-disks with which the teeth of a worm engaging with said worm-wheel may contact, said disks being mounted to rotate in a plane oblique to the axis of the worm-wheel, and in a direction corresponding to the direction of rotation of a worm engaging said worm-wheel, substantially as described.

6. A worm-wheel having for each tooth two friction-disks forming the front and back faces of the tooth, and mounted to rotate in a plane oblique to the axis of the worm-wheel and in a direction corresponding to the direction of rotation of a worm engaging said worm-wheel, the axis of each pair of disks being offset so that the disks may all be central with respect to a worm engaging the worm-wheel, substantially as described.

7. A worm-wheel provided with revoluble friction-disks with which the teeth of a worm engaging with said worm-wheel may contact, said disks having ball-bearings, substantially as described.

8. A worm-wheel provided with revoluble friction-disks, secured to suitable supports by pivot-pins, and with which the teeth of a worm engaging with said worm-wheel may contact, said disks and supports being provided with registering grooves containing bearing-balls, substantially as described.

9. A worm-wheel consisting of end pieces, supporting-pieces secured to said end pieces, and friction-disks revolubly secured to said supporting-pieces, and with which a worm engaging said worm-wheel may contact, substantially as described.

10. In a worm-wheel, the combination, with end pieces having at intervals grooves for receiving supporting-pieces, of supporting-pieces fitting into said grooves and extending from one end piece to the other, means for preventing separation of the end pieces, and friction-disks revolubly secured to said supporting-pieces, and with which a worm engaging said worm-wheel may contact, substantially as described.

In testimony whereof I hereunto affix my signature in the presence of two witnesses.

JOHN H. BARR.

Witnesses:
  GEO. S. TARBELL,
  CLARENCE D. TARBELL.